US 6,735,574 B2

(12) United States Patent
Bull

(10) Patent No.: US 6,735,574 B2
(45) Date of Patent: May 11, 2004

(54) METHOD AND SYSTEM FOR TRACKING EMPLOYEE PRODUCTIVITY IN A CLIENT/SERVER ENVIRONMENT

(75) Inventor: Jeffrey A. Bull, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/799,770

(22) Filed: Mar. 5, 2001

(65) Prior Publication Data

US 2001/0008999 A1 Jul. 19, 2001

Related U.S. Application Data

(63) Continuation of application No. 08/964,943, filed on Nov. 5, 1997, now abandoned.

(51) Int. Cl.[7] .............................................. G06F 17/60
(52) U.S. Cl. .......................................... 705/32; 705/11
(58) Field of Search ...................... 705/11, 32; 713/201; 717/170

(56) References Cited

U.S. PATENT DOCUMENTS

| 4,034,194 A | 7/1977 | Thomas et al. ....... 235/153 AC |
| 4,334,307 A | 6/1982 | Bourgeois et al. ............ 371/16 |

(List continued on next page.)

FOREIGN PATENT DOCUMENTS

| JP | 403158961 A | * 7/1991 | ............ G06F/15/16 |

OTHER PUBLICATIONS

"Version Equalizer Program for Server/Client," IBM Technical Disclosure Bulletin, vol. 38, No. 8, pp. 575–576, Aug. 1, 1995.*

"Timeslips Deluxe for Windows User's Guide, Version 8." Sage U.S. Inc. Copyright 1985–1999.*

Davis, Tom C. "Timeslips Deluxe for Windows, Version 8." Accounting Technology, vol. 13, No. 7, p. 35, Aug. 1997.*

Skillman, Brad. "Can't Get No Satisfaction." Accounting Technology, vol. 13, No. 8, pp. 25–32, Sep. 1997.*

Kahan, Stuart. "Going After Law Firms As Clients." The Practical Accountant. vol. 30, No. 2, pp. 48–51, Feb. 1997.*

Komando, Kim. "Billing Software for Lawyers: You Be the Judge Program Vendors Offer Free Tryouts of Package Deals." Arizona Business Gazette, "Small Business" section, "Computers" col., p. 5, May 24, 1991.*

(List continued on next page.)

*Primary Examiner*—Susanna Meinecke-Díaz
(74) *Attorney, Agent, or Firm*—Dorsey & Whitney LLP

(57) ABSTRACT

A method and system for tracking the productivity of technical support specialists in a call center using a client/server configuration. The system comprises a client component and a server component. The client component displays on a display device a form for entry of normal activity and exceptions to normal activity. The client component receives from the technical support specialist indications of normal activity and exceptions. Each indication of an exception includes its type and its length. The client component then requests the server component to record information relating to normal activity and exceptions. When the server component receives the request to record the information, the server component stores the information in a database. The system also provides a reporting component for generating reports to analyze the information stored in the database.

8 Claims, 15 Drawing Sheets

U.S. PATENT DOCUMENTS

| | | | |
|---|---|---|---|
| 4,433,413 A | 2/1984 | Fasang | 371/25 |
| 4,819,162 A | 4/1989 | Webb, Jr. et al. | 364/401 |
| 4,881,230 A | 11/1989 | Clark et al. | 371/20.1 |
| 4,964,125 A | 10/1990 | Kim | 371/15.1 |
| 5,010,551 A | 4/1991 | Goldsmith et al. | 371/16.4 |
| 5,068,787 A | 11/1991 | Pipella et al. | 364/406 |
| 5,182,705 A | 1/1993 | Barr et al. | 364/401 |
| 5,455,933 A | 10/1995 | Schieve et al. | 395/183.03 |
| 5,459,657 A | 10/1995 | Wynn et al. | 364/401 |
| 5,463,766 A | 10/1995 | Schieve et al. | 395/650 |
| 5,493,492 A * | 2/1996 | Cramer et al. | 364/406 |
| 5,508,977 A | 4/1996 | Tymn | 368/10 |
| 5,519,832 A | 5/1996 | Warchol | 395/183.22 |
| 5,521,842 A | 5/1996 | Yamada | 364/514 B |
| 5,646,839 A | 7/1997 | Katz | 379/93.01 |
| 5,696,702 A | 12/1997 | Skinner et al. | 364/551.01 |
| 5,710,887 A | 1/1998 | Chelliah et al. | 395/226 |
| 5,715,374 A | 2/1998 | Heckerman et al. | 395/81 |
| 5,720,001 A | 2/1998 | Nguyen | 395/10 |
| 5,742,829 A * | 4/1998 | Davis et al. | 717/718 |
| 5,764,916 A | 6/1998 | Busey et al. | 395/200.57 |
| 5,771,354 A | 6/1998 | Crawford | 395/200.59 |
| 5,784,539 A | 7/1998 | Lenz | 395/50 |
| 5,794,237 A | 8/1998 | Gore, Jr. | 707/5 |
| 5,802,493 A | 9/1998 | Sheflott et al. | 705/1 |
| 5,802,504 A | 9/1998 | Suda et al. | 706/11 |
| 5,838,682 A | 11/1998 | Dekelbaum et al. | 370/401 |
| 5,842,181 A | 11/1998 | Fanjoy | 705/32 |
| 5,884,045 A | 3/1999 | Kurihara | 395/200.67 |
| 5,903,642 A | 5/1999 | Schwartz et al. | 379/309 |
| 5,915,010 A | 6/1999 | McCalmont | 379/212 |
| 5,918,207 A | 6/1999 | McGovern et al. | 705/1 |
| 5,970,468 A * | 10/1999 | Bull | 705/11 |
| 6,014,658 A | 1/2000 | Pretz | 707/2 |
| 6,141,649 A * | 10/2000 | Bull | 705/11 |

OTHER PUBLICATIONS

PALM 3, "Manual of Patent Program Procedure," U.S. Patent & Trademark Office, vol. 2, Chapter 900—Reporting Examiner's Actions, made public in U.S. Patent No. 4,878,176, Oct. 1989.*

PALM, "Examiner's Bi–Weekly Time Worksheet (Form PTO–690–E)," U.S. Patent & Trademark Office, Jun. 1990.*

PALM 3, "PALM Sample Printouts (PALM III Biweekly Examiner Time and Activity Report)," U.S. Patent & Trademark Office, made public in U.S. Patent No. 4,878,176, Oct. 1989.*

PALM 3, "PALM 3 User's Guide," U.S. Patent & Trademark Office, made public in U.S. Patent No. 4,878,176, Oct. 1989.*

Juris, Inc, "Timesheet Owner's Manual," Apr. 1996.*

"Screen Captures from Juris TimeSheet" (taken from a disk with version 1.33 © 1993–1997, which corresponds to the capabilities of TimeSheet described in "TimeSheet Owner's Manual," published in Apr. 1996).*

Lessing, Tom, "TomChat version 4.02 for Win95 and WinNT 4.x" at 9518132@ml.petech.ac.za.

Murray, Rink, "New & Improved; News of Announced Products and Upgrades," vol. 10, No. 1, pp. 55(4), Jan. 1991.

Angus, Jeff, "Billing Software Evolves Into an Essential Accounting Tool," InfoWorld, vol. 15, No. 38, p. 125, Sep. 1993.

Scott, Robert W., "Windows—ability Affects Accountant Buying Decisions," Accounting Today vol. 8, No. 3, pp. 16(2), Feb. 1994.

Schlein, Carol L., "A First Look at Timeslips 5.1 for Windows," Law PracticeManagement, vol. 20, No. 2, pp. 44(4), Mar. 1994.

O'Connor, Thomas J., "Catching the Clock," Law Office Computing, vol. 5, No. 2, pp. 52(4), Apr. 1995.

Bandy, Brian and Ben Smith, "YAK–Winsock Personal Chat Program and Multi–Document Test Editor—Version 1.0 beta", 1996, at bbandy@whc.net and benbean@ionet.net.

Peterson, Franklynn, "Guide to Time and Billing Software," Journal of Accountancy, vol. 181, No. 6, pp. 62(5), Jun. 1996.

"Sage Delivers Time–Based Billing and Job–Tracking System for the UK," Computergram International, No. 2953, Jul. 1996.

"Timeslips Corporation," Accounting Today, vol. 10, No. 12, pp. S12, Jul. 1996.

Angus, Jeffrey Gordon, "Elegant Tools for Internet Billing," Computerworld, vol. 30, No. 38, p. 92, Sep. 1996.

Bellone, Robert H., "Practice Management: Make Time for Time and Billing," Accounting Technology, vol. 12, No. 9, pp. 23+, Oct. 1996.

TimeSheet System Administrator Guide, Juris, Inc., Apr. 1997.

Davis, Tom C., "Timeslips Deluxe 7 Windows," Visual Practice Management, vol. 11, No. 6, pp. 24(3), Apr. 1997.

TimeSheet Owner's Manual Update, Juris, Inc., May 1997.

Skillman, Brad, "Can't Get No Satisfaction," AccountingTechnology, vol. 13, No. 8, pp. 25–32, Sep. 1997.

Timeslips Deluxe for Windows (User's Guide—Version 8.0, $2^{nd}$ Ed), Sage U.S., Inc., 1985–1999.

TimeSheet Professional (7.0 User Guide), Sage U.S., Inc., 1992–1999.

ICQ Website (http://www.icq.com/support/) Guided Tour—Product's Features, Feb. 22, 1999.

Timeslips.com's Summary of Product Releases, Retrieved on Apr. 10, 2000 from Internet <http://www.timeslip.com>, Apr. 2000.

Office of Automation Concepts Implementation, "PALM 3 User's Guide," Oct. 11, 1982.

* cited by examiner

METHOD AND SYSTEM FOR TRACKING EMPLOYEE PRODUCTIVITY IN A CLIENT/SERVER ENVIRONMENT

CROSS-REFERENCE TO RELATED APPLICATION

This application is a continuation of U.S. patent application Ser. No. 08/964,943, filed Nov. 5, 1997 now abandoned.

TECHNICAL FIELD

The present invention relates generally to computer systems and, in particular, to a computer system for tracking employee productivity.

BACKGROUND OF THE INVENTION

Various types of organizations (e.g., developers of computer programs and manufacturers of computer systems) provide telephonic customer support services. To use such customer support services, a customer places a call to a customer support center for the organization. When the call is received at the customer support center, the call is distributed to one of the available customer service representatives. Each customer service representative typically has a computer system through which the representative can access information needed to respond to a customer. These computer systems are typically personal computers that are connected through a network to a server computer system. The server computer system provides access to the information needed to respond to the customers. For example, manufacturers of personal computers typically provide technical support via telephone to their customers. When a technical support specialist of the manufacturer is routed a telephone call, the specialist assesses the needs of the customer and prepares and provides an appropriate response, such as how to repair the configuration file of the customer's computer system.

The cost of providing such a customer service center for technical support can be very high. In addition to the salaries of each of the technical support specialists, the manufacturer typically spends significant amounts on training the technical support specialists and on providing computer systems to aid the specialists in servicing the customers. Therefore, it is very important that these highly trained specialists operate as productively as possible. Unfortunately, it has been very difficult to assess the productivity of technical support specialists. In particular, technical support specialists may work on various tasks other than receiving incoming calls from customers. For example, in order to respond to a customer, the technical support specialist may need to spend some time researching the customer's problem. The specialist may need to present the customer's problem to an experienced systems programmer who can then help provide a solution to the problem. Also, the technical support specialist often needs to place a follow-up call to the customer to provide the response. In addition, technical support specialists may need to attend various meetings and classes when they would otherwise be available to receive incoming calls from customers. For example, a technical support specialist may need to attend a class on a new feature of a computer system that will soon be sold by the manufacturer.

Because the technical support specialists can spend their day performing a variety of tasks, it has been difficult to assess their productivity. Consequently, supervisors of the technical support specialists have in the past requested that each specialist provide a tracking of the time in which the technical support specialist was not available to respond to an incoming call. The technical support specialists would typically hand write a log of their time spent other than answering incoming calls and forward the log to the supervisor. The supervisor would then correlate the information in the logs and attempt to evaluate the productivity of the technical support specialist. Using such information, the supervisor can identify ways to improve the availability of specialists to receive incoming calls. For example, the supervisor may request that systems programmers provide prompt attention or that additional specialists be hired.

Unfortunately, such an informal technique for the tracking time of specialists has serious disadvantages. First, if specialists do not record their time in the logs contemporaneously with the activity, then the accuracy of the logs suffers. Second, different specialists may record different levels of detail. For example, one specialist may record that time was spent generally on research, while another specialist may record that time was spent reviewing manuals to respond to a configuration file problem, talking to a systems programmer, and placing a follow-up call to the customer. Third, because the logs are handwritten, the supervisor is likely not able to perform a meaningful analysis of the logs in a reasonable amount of time.

SUMMARY OF THE INVENTION

An embodiment of the present invention provides a method and system for tracking the productivity of representatives in a call center. The productivity tracking ("PT") system comprises a PT client component and a PT server component. The PT client component is installed at each representatives' computer system. The PT client component provides data entry fields through which the representative can record productivity information that includes the start and end of periods of activity and exceptions to normal activity. Each exception indicates a type and a length. When the PT client component receives this productivity information, it forwards the information to a server computer that has the PT server component installed. The PT server component receives productivity information from several client computers and stores the information in a central database. To display productivity information to a representative, the PT client computer retrieves the information from the server computer. The PT system also facilitates the entry of exceptions in a way that increases the chances that representatives will record each exception contemporaneously with the exception. The PT system also enforces a uniform level of detail. The PT system facilitates analysis by providing the central database through which a supervisor can run various reports of productivity on individual representatives or on a group of representatives.

DETAILED DESCRIPTION OF THE INVENTION

An embodiment of the present invention provides a method and system for tracking the productivity of technical support specialists in a call center environment. The productivity tracking ("PT") system comprises a PT client component that is installed on each specialist's computer system, referred to as a client computer, and a PT server component that is installed at a server computer to which each client computer is connected. The PT client component receives productivity information from a specialist. That information includes time spent on normal activity and indications of exceptions to normal activity (i.e., abnormal activity). Each indication of normal and abnormal activity includes the amount of time spent by the specialist on that activity and, for the abnormal activity, the type of the exception. When the PT client component receives productivity information from a specialist, it forwards the information to the server computer. The PT server component receives the productivity information and stores the information in a database on the server computer. To display productivity information to a specialist, the PT client component requests the server computer to provide the information. In response to the request, the PT server component retrieves the information from the database and sends the information to the requesting client computer.

Figure 1:
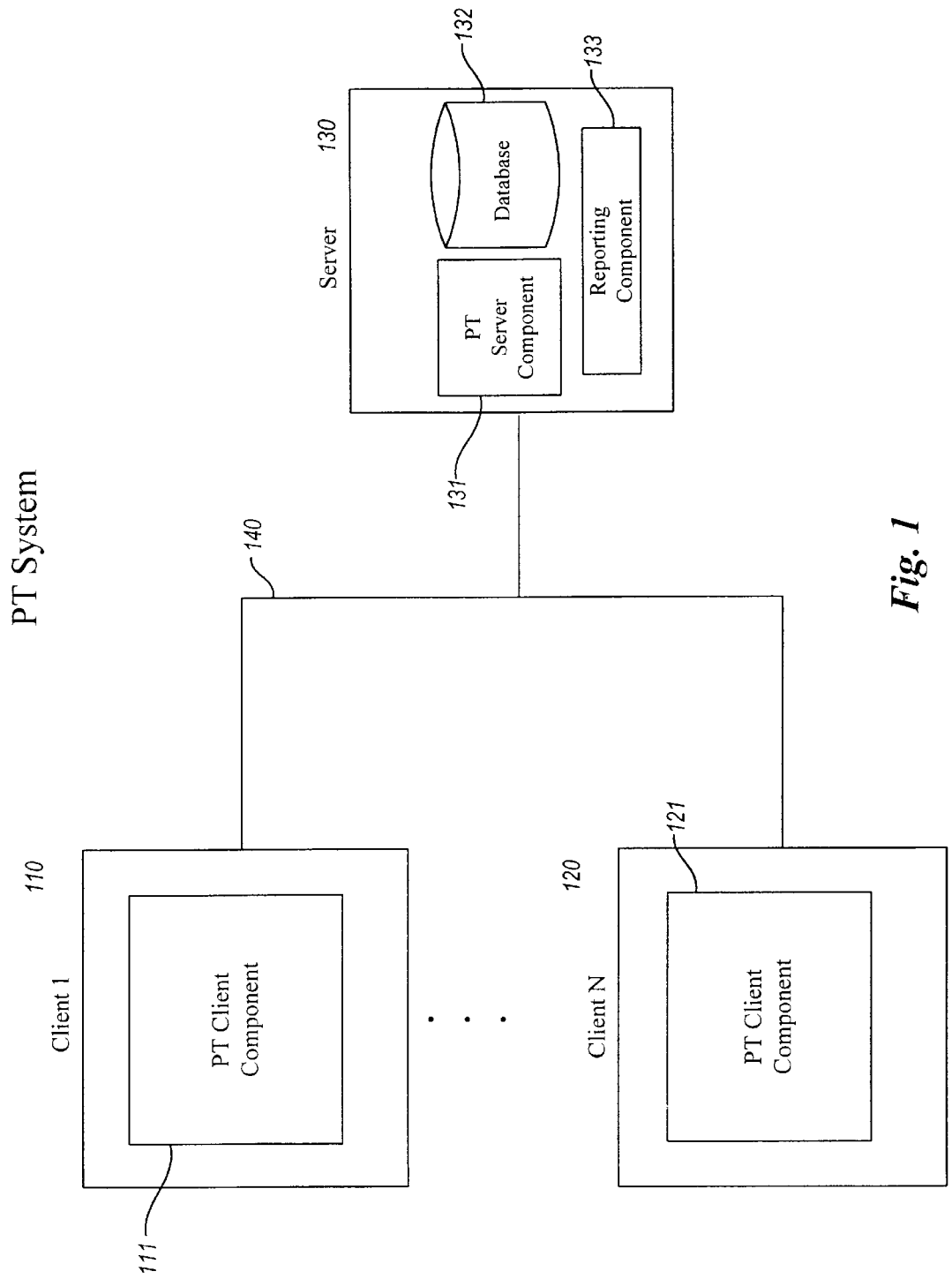
FIG. 1 is a block diagram illustrating one typical computing environment in which the PT system operates.

FIG. 1 is a block diagram illustrating one typical computing environment in which the PT system operates. The computing environment includes client computers 110, 120 and server computer 130. The computers may be any of a variety of computers that include a central processing unit, memory, storage devices, and various 110 devices. The computer systems are connected through a local area network 140 through which the computers can exchange information. However, one skilled in the art will appreciate that the computers could be connected via various mechanisms such as a wide area network or the Internet. Each client computer 110, 120 includes a PT client component 111, 121. The PT client component coordinates the receiving of timecard and exception information from a user and sending of that information to the server computer via local area network 140. The server computer comprises a PT server component 131, a database 132, and a reporting component 133. The PT server component receives requests from the client computers for the storing and for the retrieving of productivity information. The PT server component stores the productivity information in the database. The reporting component provides various reports through which a user (e.g., a supervisor of a specialist) can analyze the productivity information.

Figure 2:
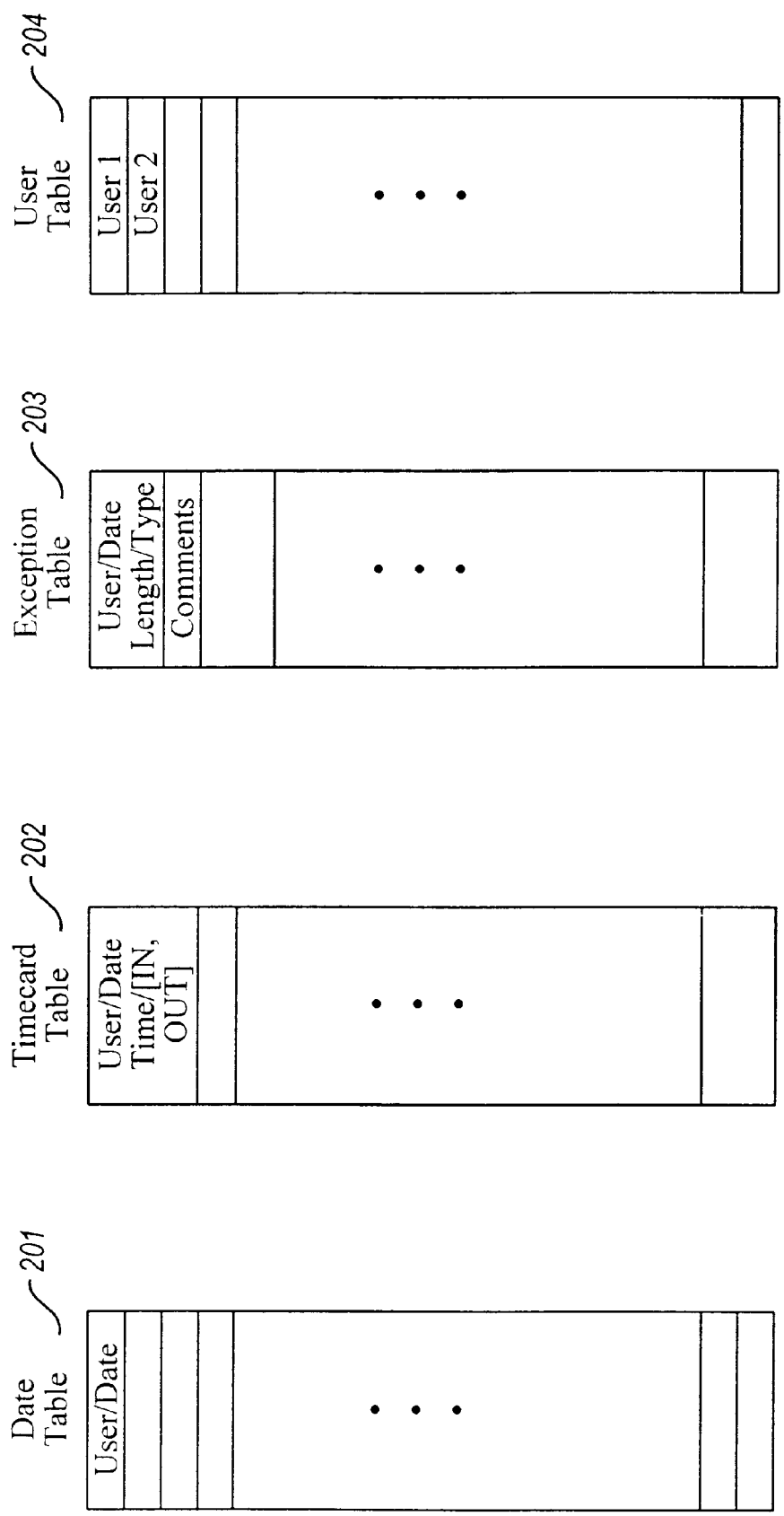
FIG. 2 illustrates one organization of the data in the database 132.

FIG. 2 illustrates one organization of the data in the database 132. The database 132 contains a date table 201, a timecard table 202, an exception table 203, and user table 204. The date table contains entries that identify a user and a date. Each entry indicates that the database contains productivity information relating to that user for that date. By accessing the date table, the PT server component can quickly determine whether a user's productivity information for a particular date has been stored. The timecard table contains an entry for each timecard event recorded by each user. A timecard event corresponds to the start of or the end of activity. Each entry in the timecard table identifies the user, the date, the time of the event, and the type of the event. The type of events include start of activity and end of activity. The exception table contains the exceptions received from the users. Each entry in the exception table identifies the user, the date of the exception, the type of the exception, the time period of the exception (i.e., length of exception), and various comments that the user may have entered to further explain the exception. The user table contains entries that identify the users who are authorized to use the PT system.

Figure 3A:
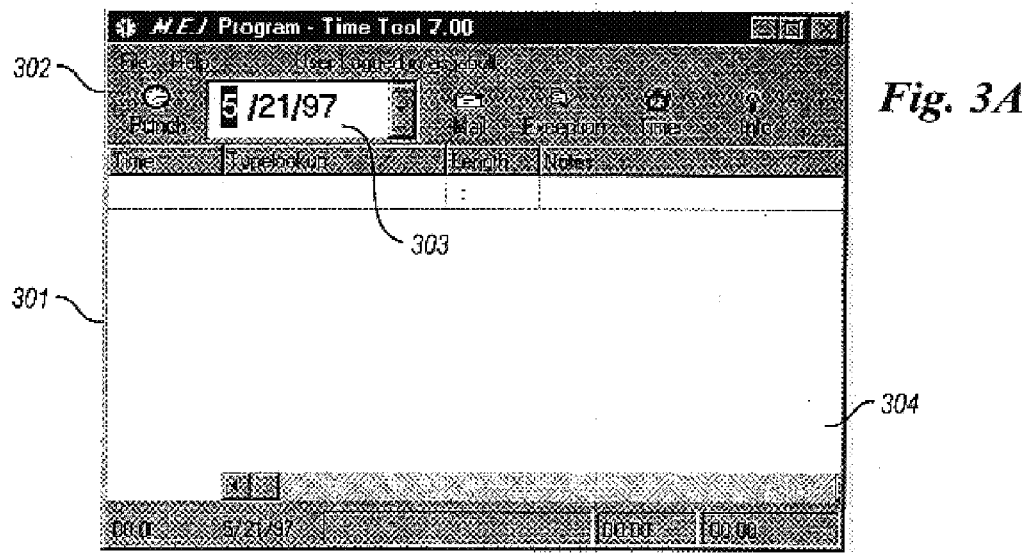
FIGS. 3A–3F illustrate one type of display window through which a user can enter the timecard and exception information.
Figure 3B:
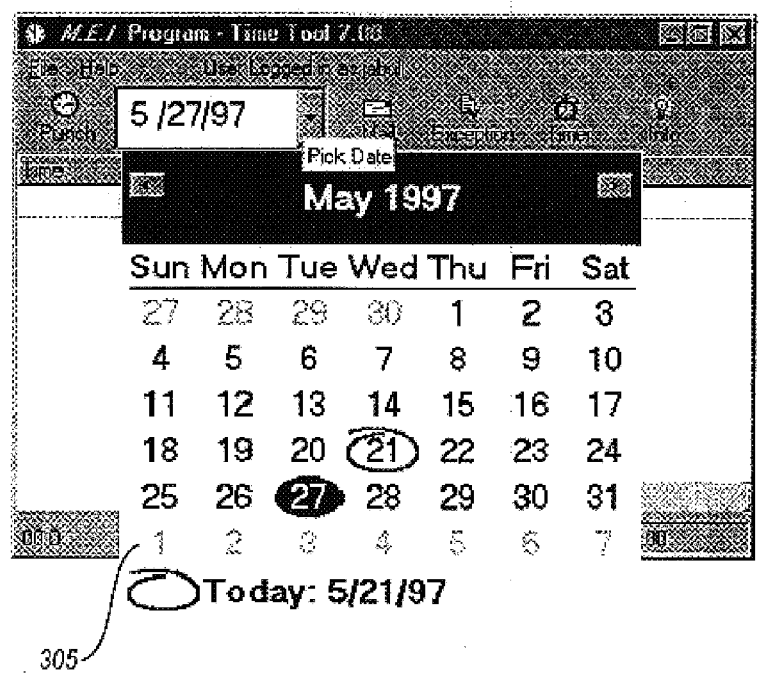

FIGS. 3A–3F illustrate one type of display window through which a user can enter the timecard and exception information. The PT window 301 contains various icons 302 through which the user can select various functions provided by the PT client component. The PT window is displayed when the PT component is executed. The icons include the punch icon, the mail icon, the exception icon, and the timer icon. When the punch icon is selected, the PT client component sends a request to the server computer to record a timecard entry that indicates activity is either starting or ending. When the exception icon is selected, the PT client component enables a user to input an exception and then it sends a request to the server computer to record that exception. When the timer icon is selected, the PT client component allows the user to time the length of an activity. When the mail component is selected, the PT client component allows the user to send an electronic mail message. The date window 303 indicates the selected date. The timecard entries and exceptions for the selected date are displayed in the display area 304. As shown in FIG. 3A, no timecard entries or exceptions for the selected date (i.e., "5/21/97") are displayed. The display area includes four columns. The "Time" column displays the timecard entries. The "Typelookup" column displays the type of each recorded exception; the "Length" column displays the length of the exception; and the "Notes" column displays comments relating to the exception. FIG. 3B illustrates the selection of the date. When the user selects the drop-down button to the right of the selected date, the PT client component displays a calendar for the month corresponding to the selected date 305. The user can then use the calendar to select another date. When a date is selected, the PT client component updates the date window. The PT client component queries the server computer to determine whether the user has recorded any productivity information for the selected date. If the selected date has associated productivity information, then the PT client component displays that information in display area 304. In this example, the user selects "5/27/97" as the date.

Figure 3C:
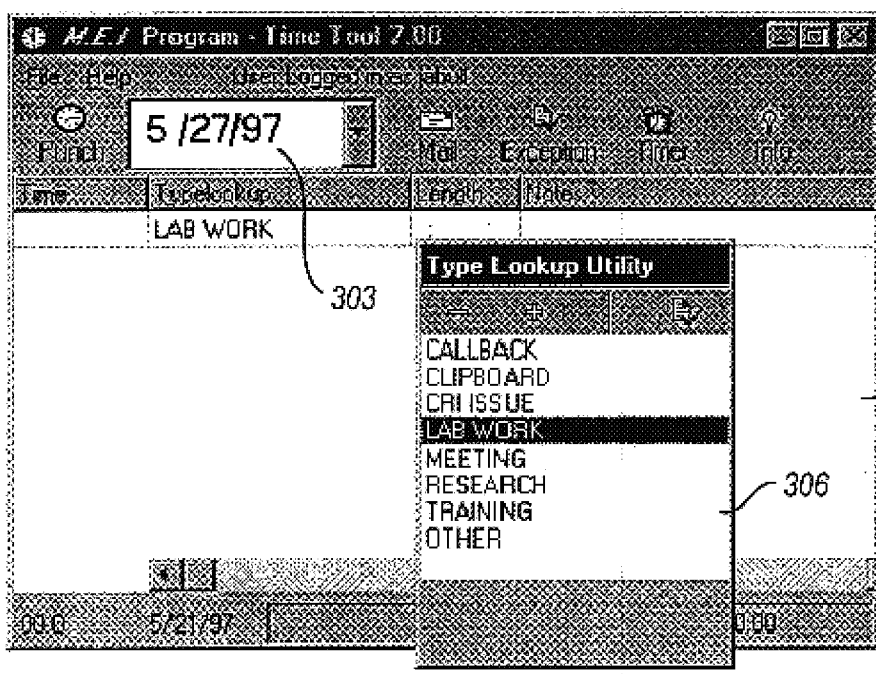
Figure 3D:
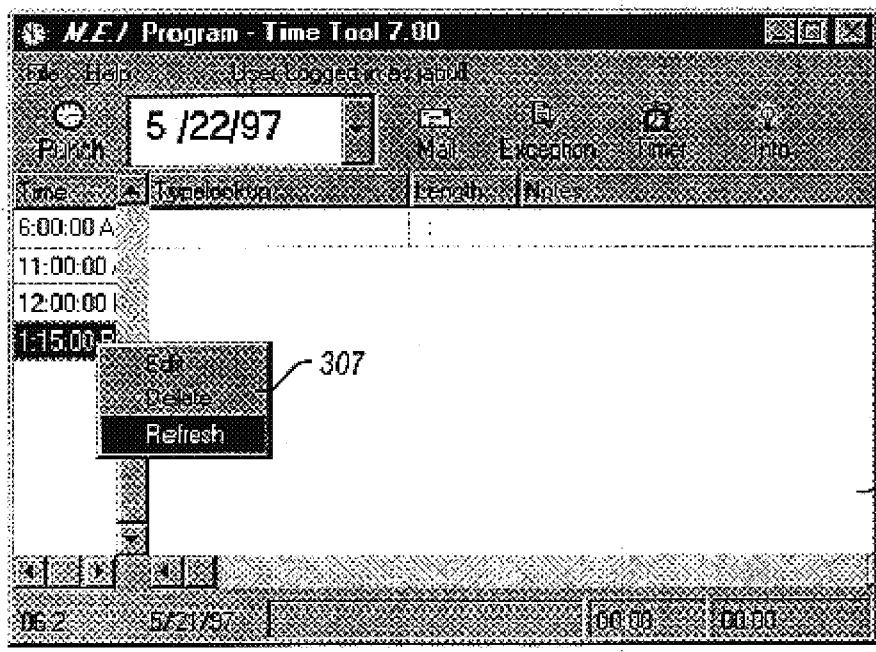
Figure 3E:
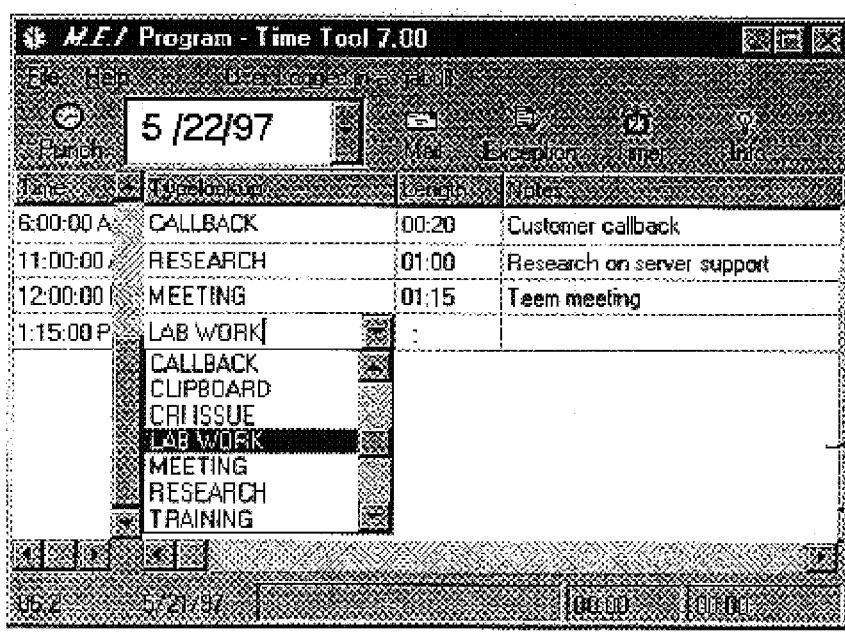
Figure 3F:
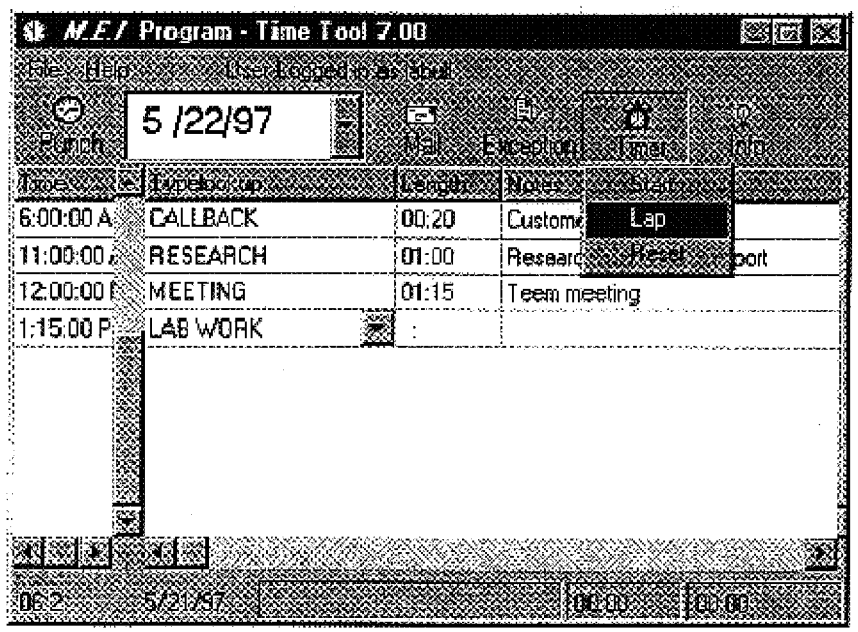

FIG. 3C illustrates one possible display of a window containing the types of exceptions and another selected date. The selected date is shown in the date window 303. When a user selects the exception icon, the window 306 of exception types is displayed. The user can then select the appropriate exception type which is displayed in display area 304 in the Typelookup column. The use of this window of exception types helps ensure a uniform level of detail of the information entered by multiple users. FIG. 3D illustrates the functions of the Time column. The Time column contains the times in which the user either started (i.e., "punched in") or ended (i.e., "punched out") an activity. The PT client component also allows the user to modify the Time column as indicated by the pop-up window 307. The Time column indicates that the user started activity at 6:00 a.m., stopped activity at 11:00 a.m., restarted activity at 12:00 p.m., and ended that activity at 1:15 p.m. FIG. 3E illustrates a typical contents of display area after the user has entered several exceptions and punched various times. FIG. 3F illustrates the use of the timer icon. The current running timer is displayed at the bottom of the window area.

Figure 4:
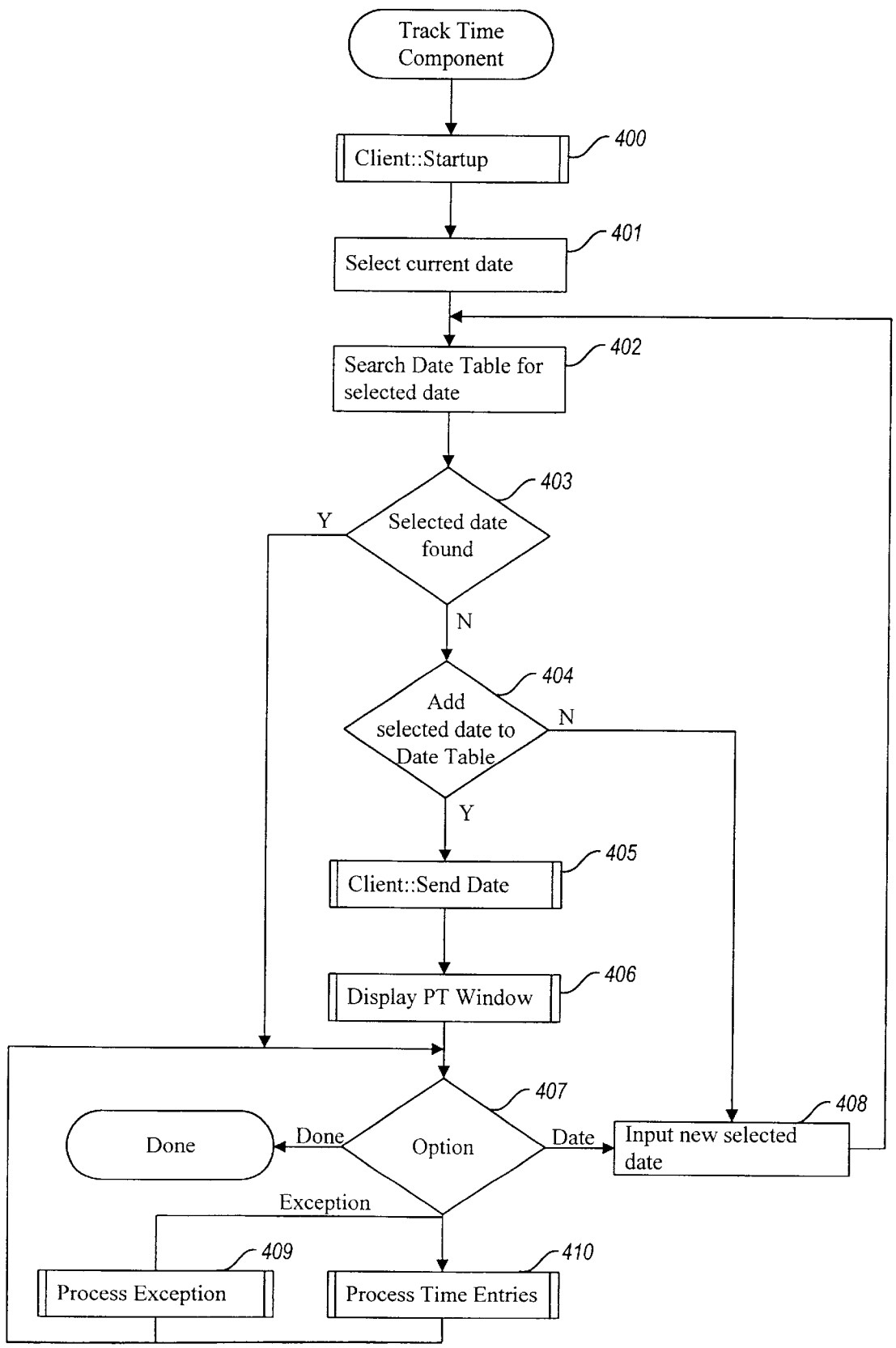
FIG. 4 is a flow diagram of an implementation of the PT client component.

FIG. 4 is a flow diagram of an implementation of the PT client component. The PT client component controls the displaying of the PT window, the entering of the timecard and exception information, and the sending of the information to the server computer. In step 400, the component invokes a routine to register the user with the server computer. In step 401, the component selects the current date as the initial date. In steps 402–410, the component loops processing various data entry options for the selected date. In step 402, the component requests the server computer to search the date table for the selected date. In step 403, if the server computer responds that the selected date is found, then the component continues at step 406, else the component continues at step 404. In step 404, the component prompts the user to determine if the selected date should be added to the date table. If so, the component continues at step 405, else the component continues at step 408. In step 405, the component requests the server computer to add the selected date to the date table. In step 406, the component displays a window indicating the current timecard entries and exceptions for the selected date and allows the user to select an option for further processing. In steps 406–410, the component loops processing the various options. The options can include to change the selected date, to modify an exception, to modify a time entry, or to complete. If the option is to select a new date, then, in step 408, the component selects a new date that is input by a user and loops to step 402 to search the date table for the selected date. If the option is to update the exceptions, then, in step 409, the component invokes a process exception routine. If the option is to update the timecard entries, then, in step 410, the component invokes a routine to process the timecard entries and loops to step 407 to input the next option.

Figure 5:
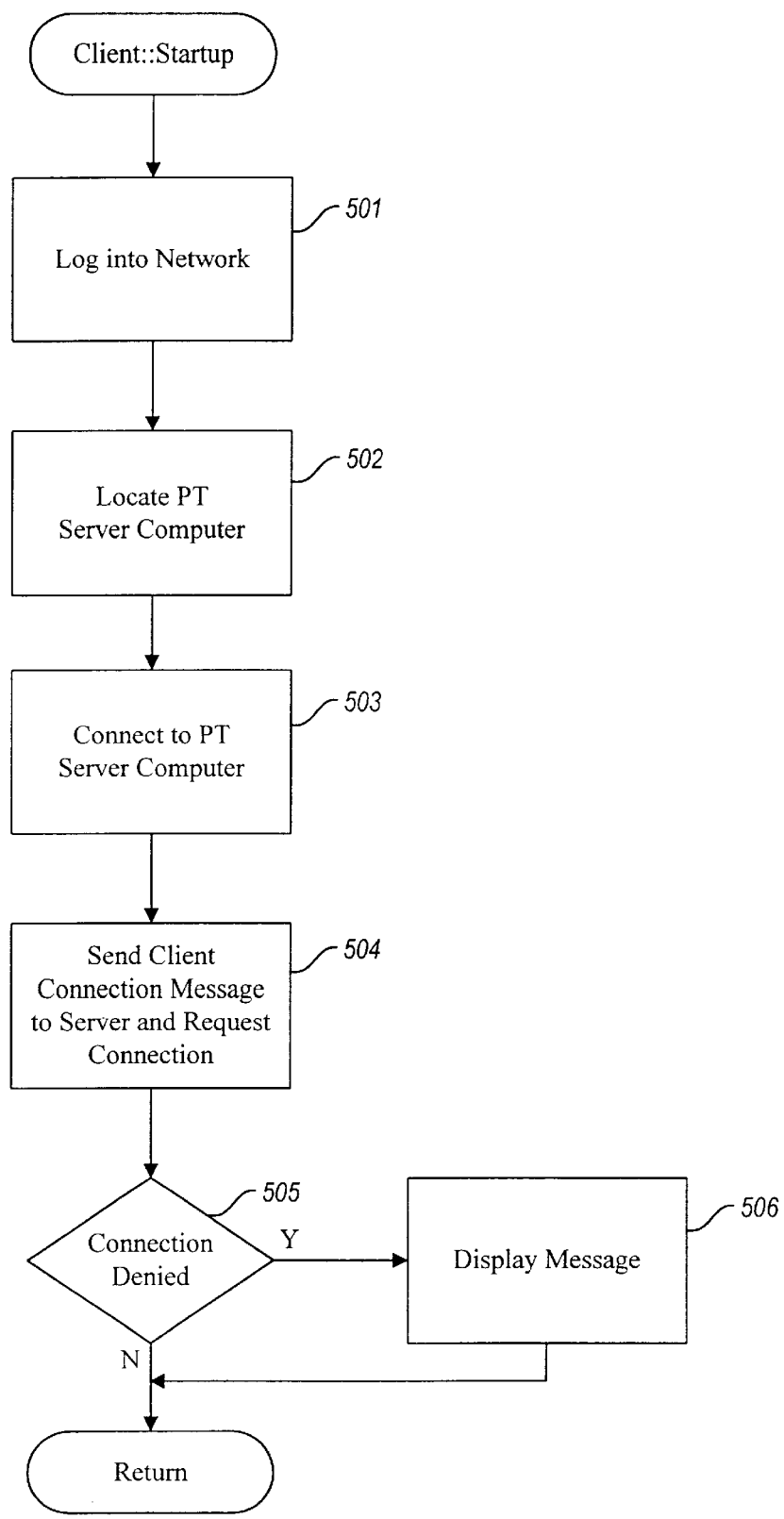
FIG. 5 is a flow diagram of a routine of the PT client component for registering the user with the server computer.

FIG. 5 is a flow diagram of a routine of the PT client component for registering the user with the server computer. This routine logs the user into the network and sends a message to the server computer that the user wishes to connect. If the connection is denied, then this routine displays a message to the user. In step 501, the routine logs the user into the local area network. In step 502, the routine locates the computer on the local area network upon which the PT server component is installed (i.e., the server computer). In step 503, the routine establishes a connection between the client computer and the server computer. In step 504, the routine sends information identifying the user and a request to establish a connection to the server computer. The routine waits until a reply is received from the server computer. In step 505, if the request to connect is denied, then the routine displays a message in step 506 informing the user of the reason for the denial and returns. If the request to connect is not denied, then the routine returns to the PT client component of FIG. 4.

Figure 6:
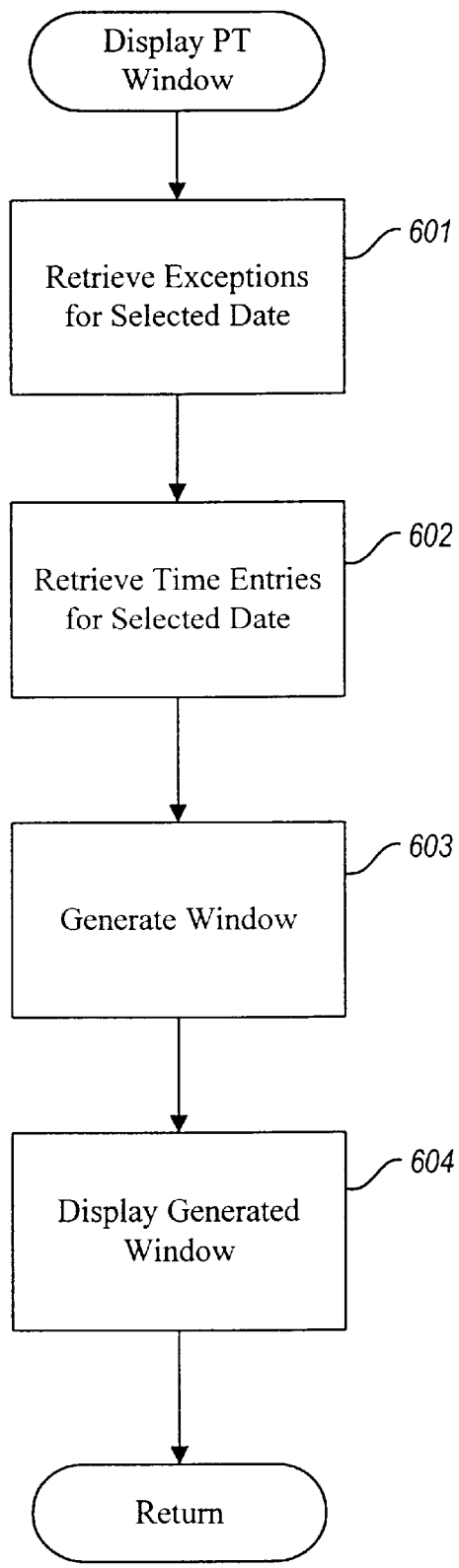
FIG. 6 is a flow diagram of the routine to display the PT window.

FIG. 6 is a flow diagram of the routine to display the PT window. The routine displays the timecard and exception information in four columns as discussed above. The routine uses the selected date to request productivity information for the user from the server computer. In step 601, the routine retrieves exceptions, if any, for the selected date from the server computer. In step 602, the routine retrieves the timecard entries, if any, for the selected date from the server computer. In step 603, the routine generates a window containing the retrieved exceptions and timecard entries. In step 604, the routine displays the generated window and returns to the PT client component of FIG. 4.

Figure 7:
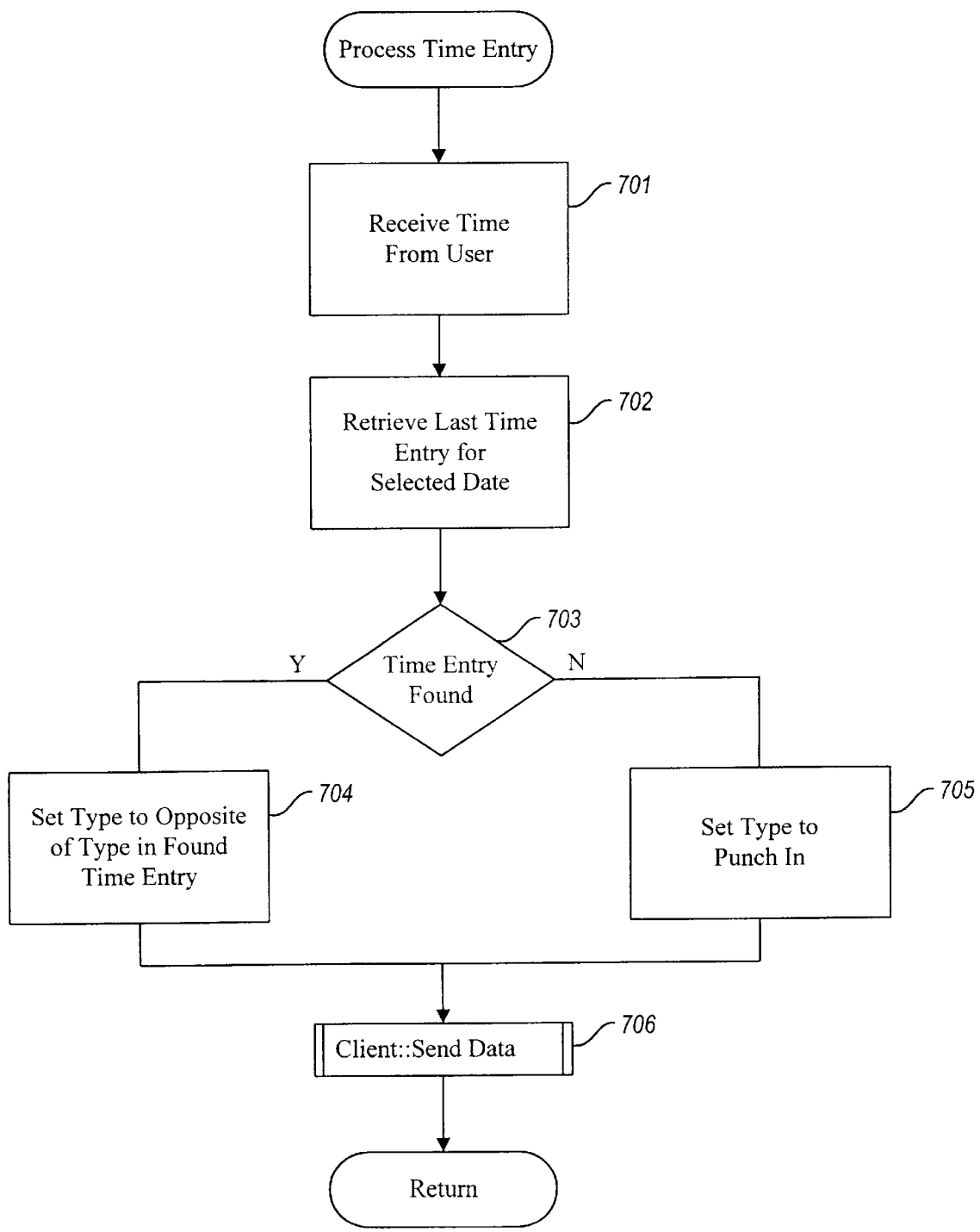
FIG. 7 is a flow diagram of the routine to process time entries.

FIG. 7 is a flow diagram of the routine to process time entries. This routine uses the timecard metaphor of "punching in" and "punching out" in which each "punch" toggles between the start of and the end of activity. Although not shown in the diagram, the routine also allows the user to modify the displayed timecard entries. This routine is invoked when the user selects the punch icon. In step 701, the routine retrieves a time from the user. The time could default to the current time. In step 702, the routine retrieves the last timecard entry for the selected date for the user from the server computer. In step 703, if such a timecard entry is found by the server computer, then the routine continues at step 704, else the routine continues at step 705. In step 704, the routine sets the type to the opposite type that is found in the timecard entry. That is, if the type of the timecard entry indicates that the user is currently punched in, then the opposite type is that the user is punched out. In step 705, the routine sets the type to punch in, because this is the first timecard entry for the selected date. In step 706, the routine requests the server computer to add a new timecard entry for the user with the selected time and the set type and returns. One skilled in the art will appreciate that this routine could be modified to accommodate activity that spans two dates (e.g., from 11:00 p.m. to 7:00 a.m.).

Figure 8:
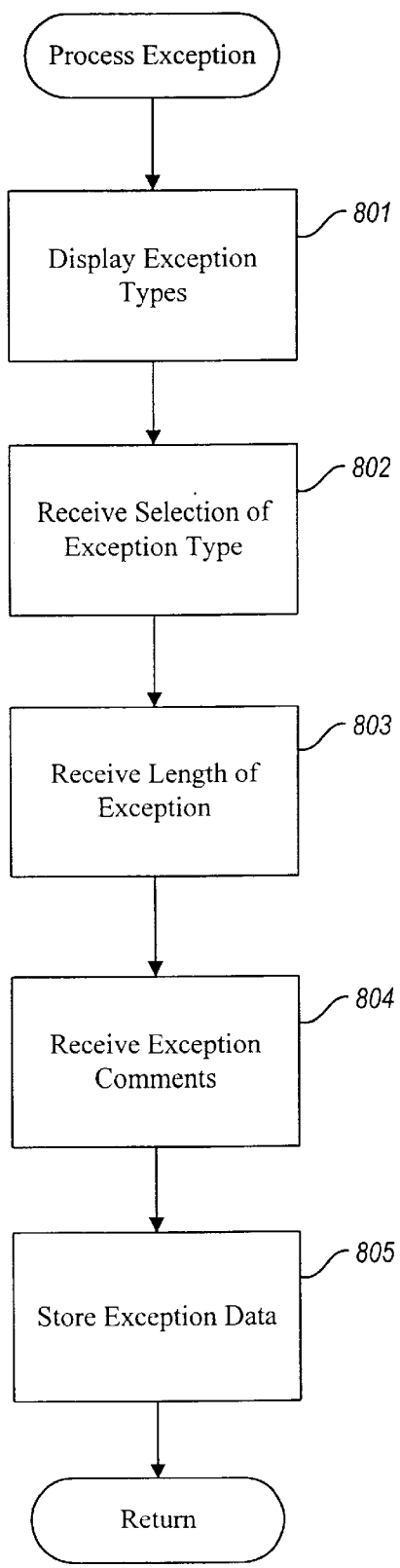
FIG. 8 is a flow diagram of a routine to process exceptions.

FIG. 8 is a flow diagram of a routine to process exceptions. This routine allows the user to enter the exception information into the three exception columns. The routine then requests the server computer to store the exception information in the exception table. Although not shown in the diagram, the routine also allows a user to modify the exceptions. The routine is invoked when the user selects the exception icon. In step 801, the routine displays the exception types, which may include among other things callback, clipboard, meeting, research, and training. In step 802, the routine receives a selection of the exception type from a user. In step 803, the routine receives a length of the exception. This length may default to the current value of the timer. The timer is started when a user starts an abnormal activity by selecting the timer icon of the PT window. In step 804, the routine receives exception comments from the user. In step 805, the routine requests the server computer to store an exception entry and returns to the PT client component of FIG. 4.

Figure 9:
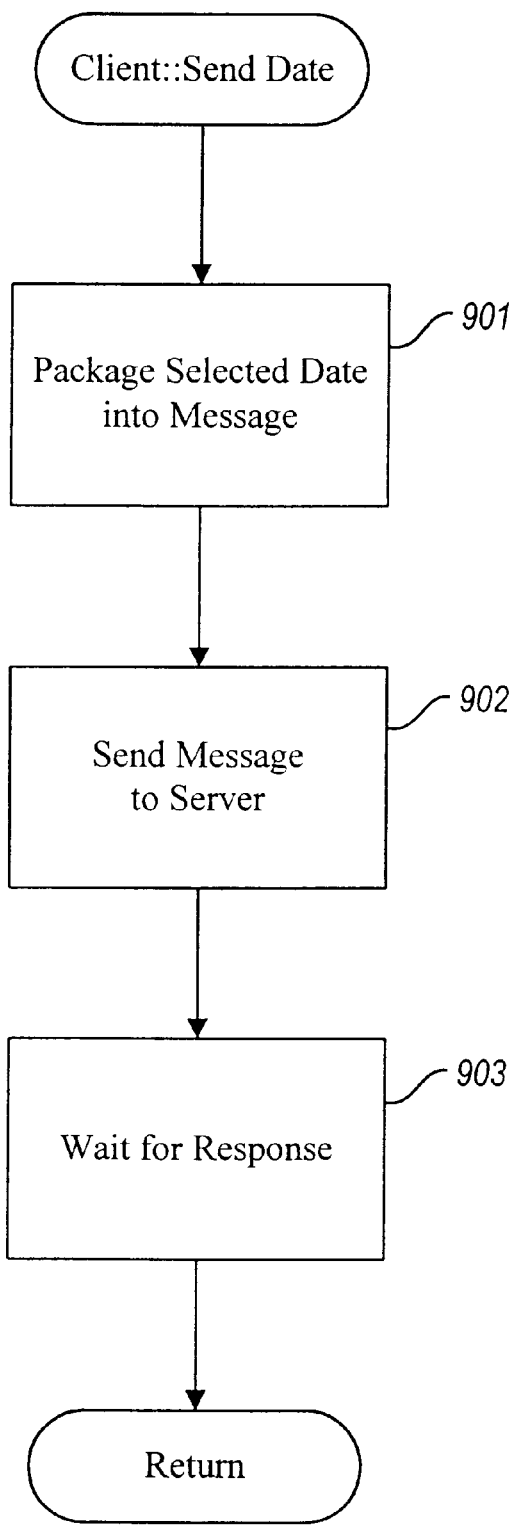
FIG. 9 is a flow diagram of a routine to send a date message to the server computer.

FIG. 9 is a flow diagram of a routine to send a date message to the server computer. The PT client component sends the date message to determine whether productivity information for the user for the selected date is already stored at the server computer. In step 901, the routine packages the selected date into a message. In step 902, the routine sends the message to the server computer. In step 903, the routine waits until a response is received from the server computer or until a predefined time period expires and returns to the PT client component of FIG. 4.

Figure 10:
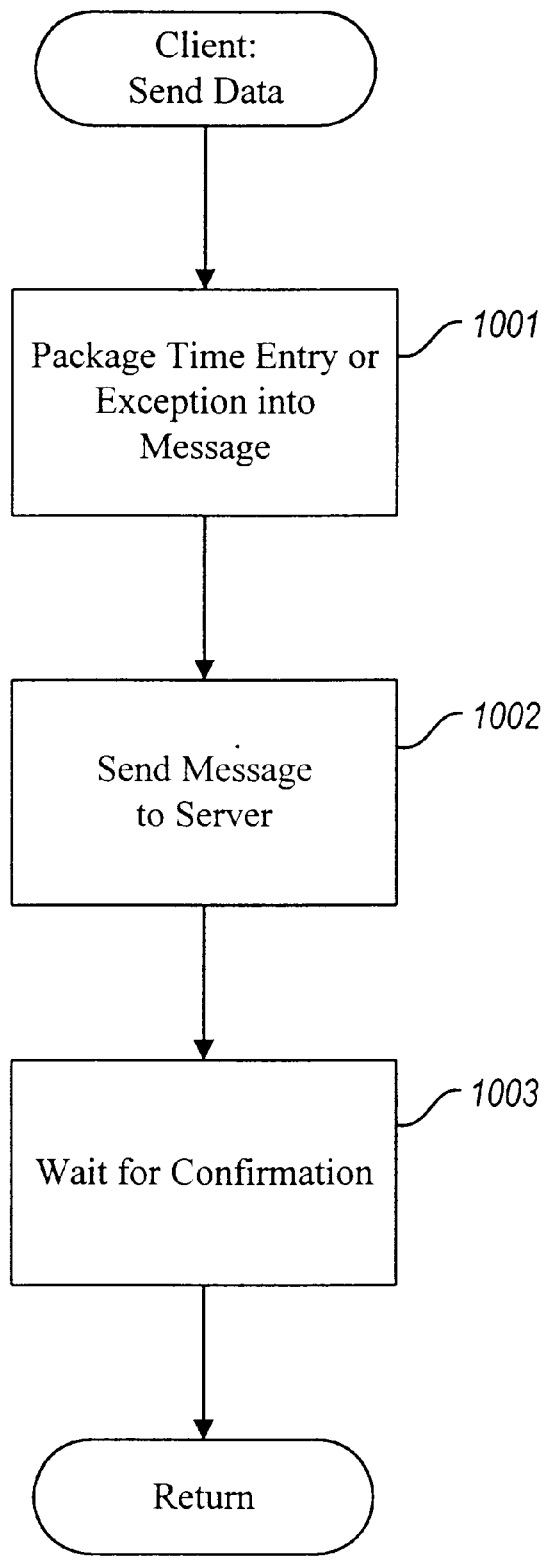
FIG. 10 is a flow diagram of a routine to send productivity information to the server computer.

FIG. 10 is a flow diagram of a routine to send productivity information to the server computer. The PT client component invokes this routine when the user has entered new timecard or exception information. In step 1001, the routine packages the timecard or exception information into a message. In step 1002, the routine sends the message to the server computer. In step 1003, the routine waits for confirmation from the server computer that the information was entered or waits until a predefined time period expires and returns to the process time entries routine.

Figure 11:
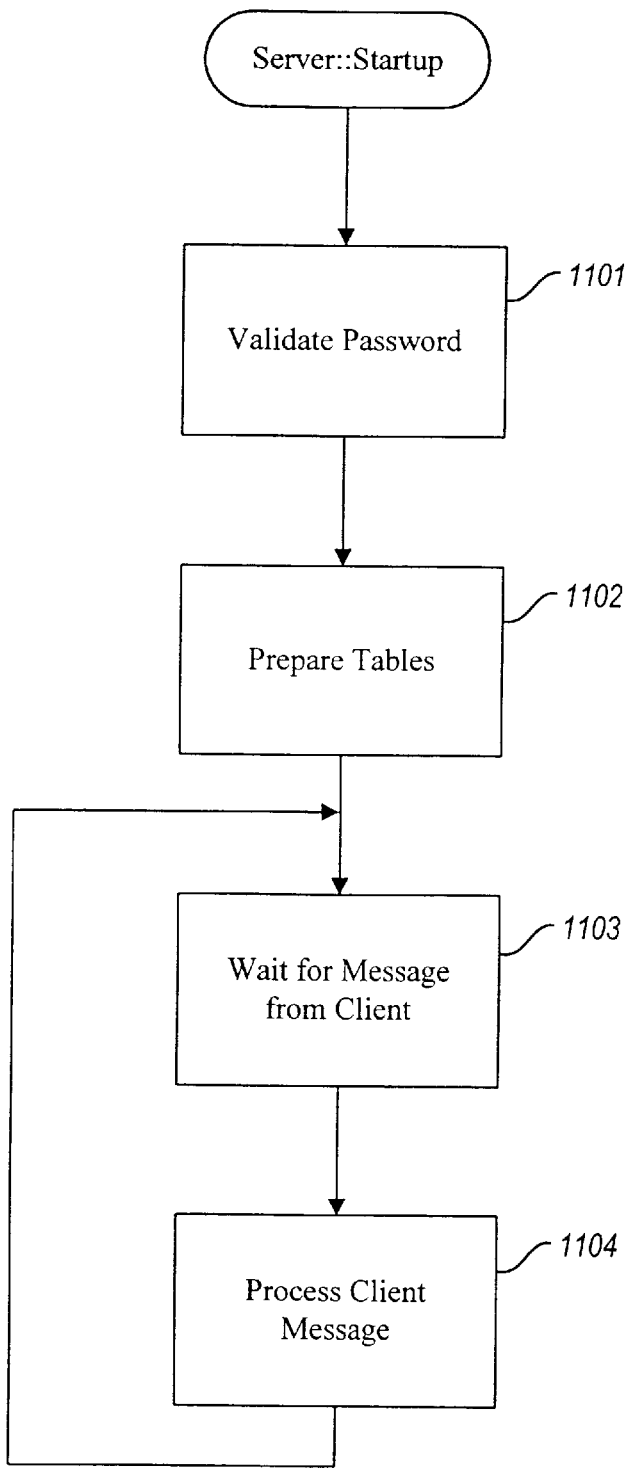
FIG. 11 is a flow diagram of the initialization routine of the PT server component.
Figure 12:
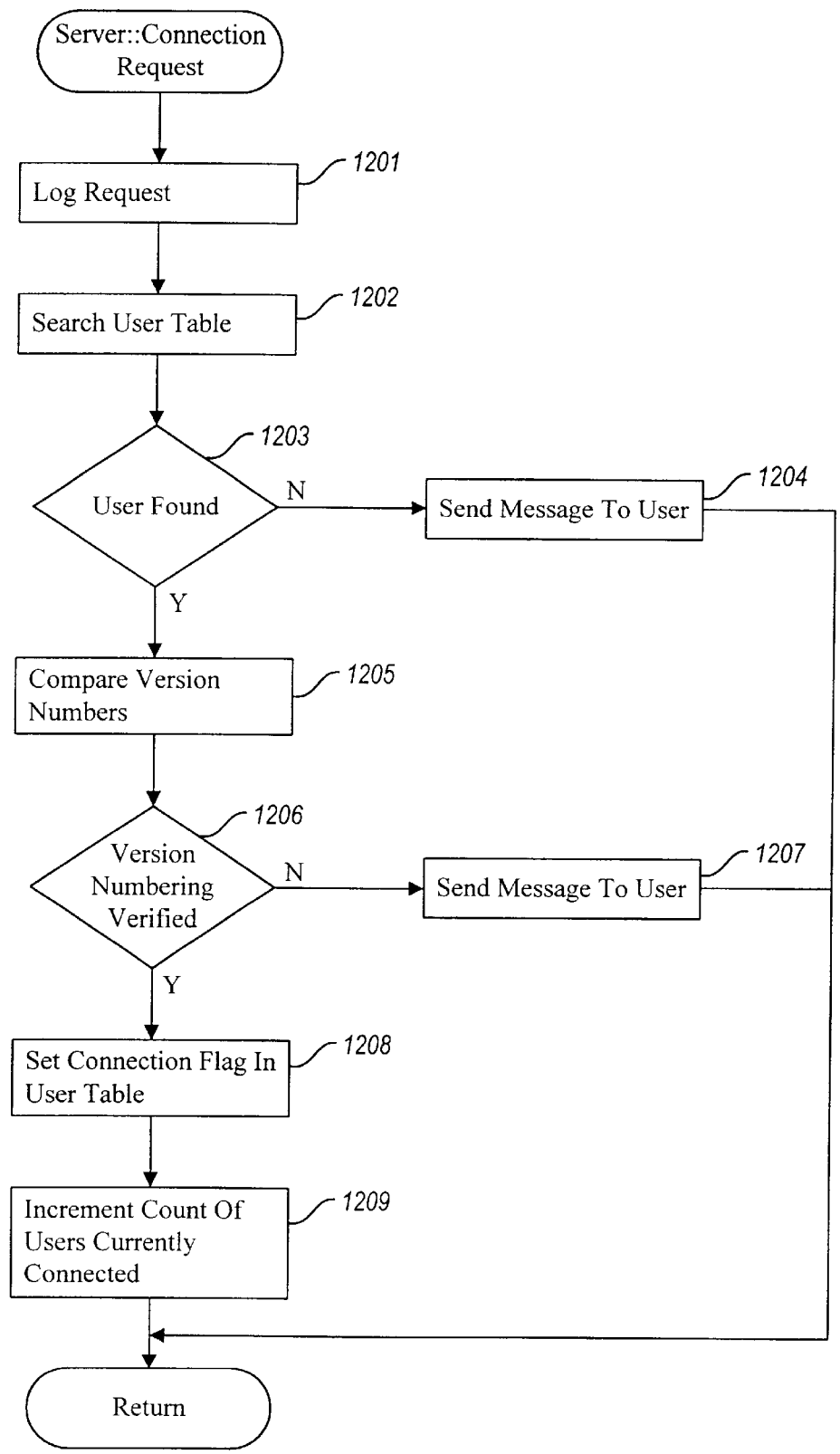
FIG. 12 is a flow diagram of a routine to process a message received from a client computer requesting to connect the client computer to the server computer.
Figure 13:
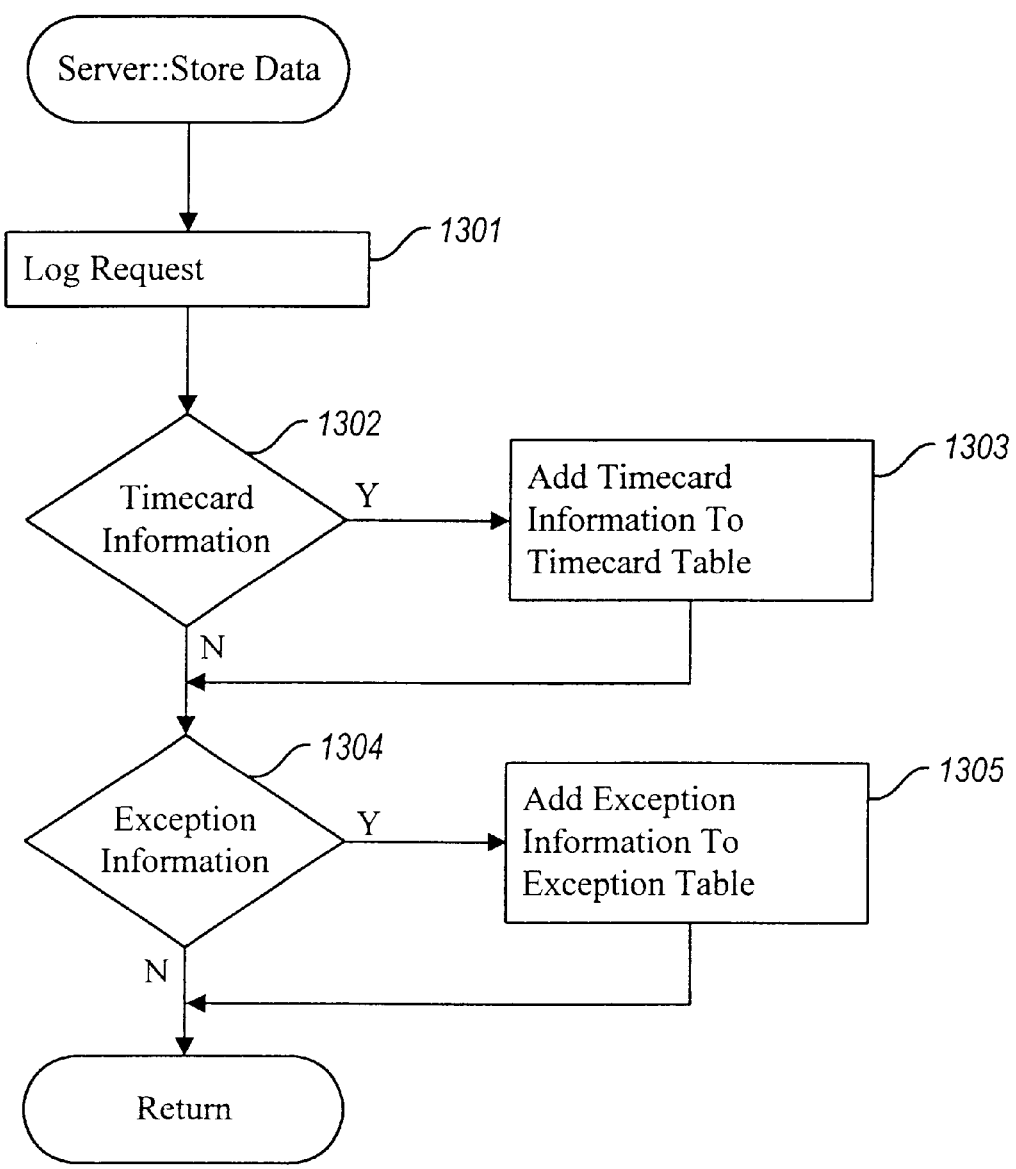
FIG. 13 is a flow diagram of a routine that processes requests from client computers to store data.

FIGS. 11–13 illustrate the processing of the PT server component. The PT server component receives various messages from the client computer systems and processes the messages.

FIG. 11 is a flow diagram of the initialization routine of the PT server component. The PT server component performs some initial validations and preparations and then loops receiving and processing messages from the client computers. The PT server component executes on the server computer and in an embodiment can be started at the request of a systems administrator. In step 1101, the routine validates a password supplied by a user (e.g., systems administrator) to ensure that an authorized user has requested to start the PT server component. In step 1102, the routine opens the various database tables. In steps 1103–1104, the server loops receiving messages from clients and processing the messages by storing and retrieving data from the database tables. In step 1103, the routine waits for a message from a client. In step 1104, the routine processes the message received from the client and loops to step 1103. The routine executes until it is terminated by a systems administrator. Alternatively, the routine can periodically check whether a termination command is issued by an administrator.

FIG. 12 is a flow diagram of a routine to process a message received from a client computer requesting to connect the client computer to the server computer. This routine determines whether the requesting user is authorized to use the PT system and verifies that the user is using a current version of the PT client component. In step 1201, the routine logs information indicating that a request has been received by the server computer from the client component. The logging of the information allows for easy tracking of the users who have requested to connect to the server computer. In step 1202, the routine searches the user table 204 to determine whether the user who is requesting connection is authorized. In step 1203, if an entry for that user is not found in the user table, then the routine continues at step 1204, else the routine continues at step 1205. In step 1204, the routine sends a message to the client computer indicating that the user is not registered and then returns. In step 1205, the routine verifies what the version number indicated in the request to connect is the current version number of the PT client component. Each time a new version of the PT system is produced, it is assigned a new version number. If the version number of a PT client component is not current, then the user at the client computer is notified. In step 1206, if the version number is verified, then the routine continues at step 1208, else the routine continues at step 1207. In step 1207, the routine sends a message to the client computer indicating that a new version is needed and returns. In step 1208, the routine sets a connection flag for that user in the user table. The PT server component uses the connection flag to identify whether a user is currently connected. The PT component uses the connection flags to inform the systems administrator of which users are currently connected. In step 1209, the routine increments a count of the number of users who are currently connected. This count may be supplied to an administrator to track the current usage of the PT system.

FIG. 13 is a flow diagram of a routine that processes requests from client computers to store data. In step 1301, the routine logs the request. In step 1302, if the received data includes timecard information, then the routine continues at step 1303, else the routine continues at step 1304. In step 1303, the routine adds the timecard information to the timecard table. In step 1304, if the received message includes exception information, then the routine continues at step 1305, else the routine returns to the PT server component of FIG. 11. In step 1305, the routine adds exception information to the exception table and returns to the PT server component of FIG. 11.

The reporting component provides various predefined reports to assist a supervisor in evaluating the productivity of the users. These reports can be tailored to the individual call processing environment. One skilled in the art will appreciate that these reports could include reports to evaluate the average time worked and the average time spent on exceptions for an individual user or for a group of users. In addition, the reports may include a monthly report that summarizes the time worked and the exceptions on a day-by-day basis. To generate the reports, the reporting component accesses the date table, the timecard table, and the exception table. In addition, the reporting component may provide various graphs and charts to aid the supervisor in visualizing the productivity.

Although the present invention has been described in terms of various embodiments, it is not intended that the invention be limited to these embodiments. Modification within the spirit of the invention will be apparent to those skilled in the art. The scope of the present invention is defined by the claims that follow.

What is claimed is:

1. A method in a client-server computer system for tracking the productivity of technical support specialists, the method comprising:

providing client version information on a server computer system;

sending an indication of the version information in a version information message to the server computer system;

receiving the version information message by the server computer system;

comparing the version information in the version information message to the version information in the server computer system to determine if the version information is current version information;

if the version information in the version information message is not current version information, sending a message to a user indicating that the version is not current;

displaying on a display device of a client computer system a form for entry of timecard and exception information;

receiving in the client computer system, from a technical support specialist using the client computer system, timecard information indicating periods when the technical support specialist was performing normal activity, and exception information indicating exceptions to the normal activity by displaying a list of exceptions selectable by the technical support specialist on the display of the client computer system and receiving an indication of an exception selected from the list of exceptions by the technical support specialist using the client computer system;

providing a date table in the server computer system for containing an indication of the technical support specialist who has entered timecard information and an indication of a date, wherein the date table contains other indications of other dates and of the technical support specialist, and further comprising comparing the indications of a date and of the technical support specialist to the indications of other dates and of the technical support specialist in the date table, and, if they do not correspond to any of the indications of other dates and of the technical support specialist, saving an indication of the start of an activity as the type of event in the timecard table;

receiving in a client computer system an indication of a date selected by, and an indication of timecard data entered by the technical support specialist;

transmitting the indications of a date and of timecard data to the server computer system;

saving the indication of a date and an indication of the technical support specialist in the date table;

sending the timecard and exception information from the client computer system to the server computer system;

storing an indication of the technical support specialist, of the timecard event, of the date and time of the event and of the type of the event in the server computer system in a timecard table;

storing an indication of the technical support specialist, of the date of the exception, of the type of exception and of the length of the exception in an exception table in the server computer system;

providing authorized user information on a server computer system;

receiving identification information from the technical support specialist in the client computer system;

sending an indication of the identification information in an identification information message to the server computer system;

receiving the identification information message by the server computer system;

comparing the identification information in the message to the authorized user information to determine if the identification information is identification information of an authorized user; and allowing access by the technical support specialist to the server computer system only if the indication of identification information corresponds to identification information of an authorized user and the version information in the message corresponds to current version information.

2. The method of claim 1 wherein the list of authorized users is stored in the server computer system in a user table and further comprising, upon allowing access by a technical support specialist who is an authorized user to the server computer system, providing an indication in the user table that the technical support specialist has been allowed access to the server computer system.

3. The method of claim 1 comprising:

providing a counter in the server computer system; and incrementing the counter in the server computer system when an authorized user is allowed access to the server computer system.

4. The method of claim 1 further comprising the step of receiving in a client computer system from a technical support specialist a comment and transmitting of the comment from the client computer system to the server computer system, and storing the comment in the exception table with the date of the exception, the type of exception and of the length of the exception.

5. A computer system for tracking the productivity of users in a call center environment, comprising:

a client component operable on a client computer system for displaying on a display device of a client computer system a form for entry of timecard and exception information, for receiving from a technical support specialist using the client computer system timecard information indicating periods when the technical support specialist was performing normal activity, displaying a list of exceptions selectable by the technical support specialist on the display of the client computer system and exception information indicating exceptions to the normal activity, receiving an indication of an exception selected from the list of exceptions by a technical support specialist using the client computer system, and for sending the timecard information and exception information to a server computer system with which the client computer system is in electronic communication, wherein the client component receives an indication of a date selected by, and an indication of timecard data entered by the technical support specialist and transmits the indications of a date and of timecard data to the server component, and wherein the server component provides a date table in the server computer system for containing an indication of the technical support specialist who has entered timecard information and the indication of the date, the date table containing other indications of other dates and of the technical support specialist, and further comprising comparing the indications of a date and of the technical support specialist to the indications of other dates and of the technical support specialist in the date table, and, if they do not correspond to any of the indications of other dates and of the technical support specialist, saving an indication of the start of an activity as the type of event in the timecard table; and a server component operable on a server computer system for receiving and storing in a timecard table an indication of the technical support specialist, of the timecard event, of the date and time of the event and of the type of the event in the server computer system in response to receipt of timecard data; and for receiving and storing in an exception table an indication of the technical support specialist, of the date of the exception, of the type of exception and of the length of the exception in response to receipt of exception data, the server component further includes server component version information and wherein the client component includes client component version information and sends an indication of client component version information in a message to the server component, and wherein, in response to receipt of the message, the server computer system compares the server component version information to the client component version information in the message and sends a message to the user if the client component version information is different from the server component version information, wherein the server component includes authorized user information and sends an indication of technical support specialist identification information in a message to the server component, and wherein, in response to receipt of the message, the server computer system compares the indication of identification information to the authorized user information in the server computer system and allows access by a technical support specialist who is an authorized user to the server computer system only if the indication of identification information corresponds to authorized user information.

6. The system of claim 5 wherein the server component saves the authorized user information in a user table and, upon allowing access by a technical support specialist who is an authorized user to the server computer system, providing an indication in the user table that the technical support specialist has been allowed access to the server computer system.

7. The system of claim 5, wherein the server component provides a counter in the server computer system and increments the counter in the server computer system when an authorized user is allowed access to the server computer system.

8. The system of claim 5 wherein the client component receives from a technical support specialist a comment and transmits it to the server component, which stores the comment in the exception table with the date of the exception, the type of exception and of the length of the exception.

\* \* \* \* \*